US010440120B2

(12) United States Patent
Galula et al.

(10) Patent No.: US 10,440,120 B2
(45) Date of Patent: Oct. 8, 2019

(54) SYSTEM AND METHOD FOR ANOMALY DETECTION IN DIAGNOSTIC SESSIONS IN AN IN-VEHICLE COMMUNICATION NETWORK

(71) Applicant: ARGUS CYBER SECURITY LTD., Tel Aviv (IL)

(72) Inventors: Yaron Galula, Kadima (IL); Shiran Ezra, Ramat Gan (IL)

(73) Assignee: Argus Cyber Security Ltd., Tel Aviv (IL)

( * ) Notice: Subject to any disclaimer, the term of this patent is extended or adjusted under 35 U.S.C. 154(b) by 0 days.

(21) Appl. No.: 15/727,642

(22) Filed: Oct. 9, 2017

(65) Prior Publication Data
US 2018/0109622 A1 Apr. 19, 2018

Related U.S. Application Data

(60) Provisional application No. 62/407,539, filed on Oct. 13, 2016.

(51) Int. Cl.
| | |
|---|---|
| *H04L 29/06* | (2006.01) |
| *H04L 29/08* | (2006.01) |
| *H04W 84/00* | (2009.01) |
| *B60R 16/023* | (2006.01) |
| *H04W 4/48* | (2018.01) |
| *H04W 12/12* | (2009.01) |
| *H04L 12/40* | (2006.01) |

(Continued)

(52) U.S. Cl.
CPC ............ *H04L 67/12* (2013.01); *B60R 16/023* (2013.01); *H04L 12/40176* (2013.01); *H04L 43/028* (2013.01); *H04L 63/1408* (2013.01); *H04W 4/48* (2018.02); *H04W 12/12* (2013.01); *H04W 84/005* (2013.01); *H04L 67/22* (2013.01); *H04L 2012/40215* (2013.01); *H04L 2012/40273* (2013.01); *H04W 4/021* (2013.01); *H04W 4/38* (2018.02)

(58) Field of Classification Search
CPC ... H04L 67/12; H04L 43/028; H04L 63/1408; H04W 4/48; H04W 12/12; H04W 84/005; B60R 16/023
USPC ....................................................... 340/905
See application file for complete search history.

(56) References Cited

U.S. PATENT DOCUMENTS

| | | | |
|---|---|---|---|
| 2011/0109938 A1* | 5/2011 | Refstrup | B41J 2/17546 358/1.15 |
| 2016/0021127 A1* | 1/2016 | Yan | G06F 21/554 726/23 |

(Continued)

*Primary Examiner* — Brent Swarthout
(74) *Attorney, Agent, or Firm* — A.C. Entis-IP Ltd.; Allan C. Entis

(57) ABSTRACT

A method of monitoring communications propagating in an in-vehicle communications network of a vehicle, the method comprising: monitoring messages transmitted over at least a portion of the in-vehicle network; determining if the transmitted messages are indicative of a current data transfer session conducted over the in-vehicle network; comparing at least one feature of a message of the transmitted messages to at least one expected feature of a message comprised in a model of the data transfer session to determine whether or not the at least one feature of the transmitted message is expected; determining that the transmitted message is an anomalous message if the feature of the transmitted message is determined to be unexpected.

20 Claims, 6 Drawing Sheets

(51) Int. Cl.
*H04L 12/26* (2006.01)
*H04W 4/021* (2018.01)
*H04W 4/38* (2018.01)

(56) References Cited

U.S. PATENT DOCUMENTS

| | | | |
|---|---|---|---|
| 2016/0381055 A1* | 12/2016 | Galula | H04L 67/12 |
| | | | 726/23 |
| 2016/0381140 A1* | 12/2016 | Rudolph | H04L 67/1097 |
| | | | 709/223 |
| 2017/0013005 A1* | 1/2017 | Galula | H04L 63/1425 |
| 2017/0093659 A1* | 3/2017 | Elend | H04L 43/08 |
| 2018/0006819 A1* | 1/2018 | Watanabe | G06F 21/44 |

* cited by examiner

| Source port | CAN ID | Sequence number |
|---|---|---|
| 1 | 0x720 | 22 |
| 1 | 0x730 | 5 |
| 2 | 0x740 | 83 |

FIG. 4

SYSTEM AND METHOD FOR ANOMALY DETECTION IN DIAGNOSTIC SESSIONS IN AN IN-VEHICLE COMMUNICATION NETWORK

RELATED APPLICATIONS

This application claims benefit under 35 U.S.C. 119(e) of U.S. Provisional Application 62/407,539 filed Oct. 13, 2016, the disclosure of which is incorporated herein by reference.

FIELD

Embodiments of the disclosure relate to detecting anomalous diagnostic messages in an in-vehicle communication network.

BACKGROUND

Over the last half a century the automotive industry, has, initially slowly, and subsequently with great rapidity, been evolving from using mechanical control systems to control a vehicle's functions to electronic "drive by wire" control systems for controlling the functions. In mechanical vehicular control systems, a driver of a vehicle controls components of a vehicle that control vehicle functions by operating mechanical systems that directly couple the driver to the components via mechanical linkages. In drive by wire vehicle control systems, a driver may be coupled directly, and/or very often indirectly, to vehicle control components that control vehicle functions by electronic control systems and electronic wire and/or wireless communication channels, rather than direct mechanical linkages. The driver controls the control components by generating electronic signals that are input to the communication channels and the electronic control systems.

Typically, a vehicular electronic control system includes a user interface for receiving driver actions intended to control a vehicle function, transducers that convert the actions to electronic control signals, and a plurality of sensors and/or actuators that generate signals relevant to the function. In other cases, electronic control systems and sensors are used in, or for, autonomous cars (e.g., driverless cars, self-driving cars, robotic cars and the like) as known in the art. An electronic control unit (ECU) of the control system receives user generated signals and the signals generated by the sensors and/or actuators, and responsive to the signals, operates to control a vehicle component involved in performing the function. The ECU of a given control system may also receive and process signals relevant to performance of the function generated by, and/or by components in, other vehicle control systems. The sensors, actuators, and/or other control systems communicate with each other and the ECU of the given control system via a shared in-vehicle communication network, to cooperate in carrying out the function of the given control system. Messages sent over an in-vehicle network as described herein may include signals and/or signal values.

By way of example, a vehicle throttle by wire control system that replaces a conventional cable between an accelerator pedal and an engine throttle may include an electronic accelerator pedal, an ECU also referred to as an engine control module (ECM), and an electronic throttle valve that controls airflow and/or fuel injection into the engine and thereby controls power that the engine produces. The electronic accelerator pedal generates electronic signals responsive to positions to which a driver depresses the pedal. The ECM receives the accelerator pedal signals, and in addition electronic signals that may be generated by other sensors, actuators, and electronic control systems in the vehicle that provide information relevant to the safe and efficient control of the engine via an in-vehicle communication network. The ECM processes the driver input signals and the other relevant signals to generate electronic control signals that control the throttle. Among the other sensors actuators, and electronic control systems that may provide relevant signals to the ECM over the in-vehicle network are, air-flow sensors, throttle position sensors, fuel injection sensors, engine speed sensors, vehicle speed sensors, brake force and other traction control sensors included in a brake by wire system, and cruise control sensors. Typically, messages sent over an in-vehicle network as described herein include one or more signals or signal values. The terms message and signal as used herein may mean, or relate to, values sent by nodes on an in-vehicle network, accordingly, the terms message and signal may be used interchangeably herein.

In-vehicle communication networks of modern vehicles are typically required to support communications for a relatively large and increasing number of electronic control systems of varying degrees of criticality to the safe and efficient operation of the vehicles. A modern vehicle may for example be home to as many as seventy or more control system ECUs that communicate with each other and sensors and actuators that monitor and control vehicle functions via the in-vehicle network. The ECUs may, by way of example, be used to control in addition to engine throttle described above, power steering, transmission, antilock braking (ABS), airbag operation, cruise control, power windows, doors, and mirror adjustment.

In addition, an in-vehicle network typically supports on board diagnostic (OBD) systems and communication ports, various vehicle status warning systems, collision avoidance systems, audio and visual information and entertainment (known in the art as infotainment) systems and processing of images acquired by on-board camera systems. The in-vehicle network in general also provides access to mobile communication networks, e.g., WiFi and Bluetooth communication networks or systems, tire pressure monitor system (TPMS), vehicle to vehicle and vehicle to infrastructure communication (V2X), keyless entry system, the Internet, and global positioning systems (GPS).

Various communication protocols have been developed to configure, manage, and control communications of vehicle components that are connected to, and communicate over, an in-vehicle communication network. Popular in-vehicle network communication protocols currently available are control area network (CAN), an automotive network communications protocol known as FlexRay, Media Oriented Systems Transport (MOST), Ethernet, and local interconnect network (LIN). The protocols may define a hardware communication bus and how the ECUs, sensors and actuators, generically referred to as nodes, connected to the communication bus, access and use the bus to transmit signals to each other.

The growing multiplicity of electronic control systems, sensors, actuators, ECUs and communication interfaces and ports, that an in-vehicle communication network supports makes the in-vehicle communication network, and the vehicle components that communicate via the communication system, increasingly vulnerable to attempts (e.g., by hackers) to damage, destroy, or interfere with an operation of, an in-vehicle network, node or system (e.g., cyber-attacks as known in the art) that may dangerously compromise vehicle safety and performance. In addition, the growing complexity of electronic control systems in vehicles makes it harder than before to identify and/or detect faults or malfunctions of, or related to, components and networks included in a vehicle.

ECUs may be configured to receive or send data (e.g., "update data" that may include software updates) over an in-vehicle network. For example, a session initiator (for example, a diagnostic terminal) may transfer update data to a target node, device or component, e.g., an ECU ("target ECU") that is targeted for receiving the transferred update data. Establishment and execution of an update data transfer session (which may be referred to herein as a "transfer session") may include preparatory steps performed by the initiator and target ECU, which steps may be characterized at being part of the following stages: a "session request stage" in which the initiator transmits a "session request" message to request a transfer session with the target ECU; a "security access stage" in which the initiator exchanges security messages with the target ECU to gain security access; and a "pre-transfer stage" in which the initiator transmits an "update start" message to the target ECU that notifies that the initiator is ready to begin transferring update data, and may include specifications regarding the upcoming update data transfer, for example size of the update data. By way of example control of the transfer session between the initiator and the target ECU may follow the ISO 14229 Unified Diagnostic Services (UDS) standard or the DoIP standard. A transfer session as referred to herein may relate to any transfer, exchange or communication of data, that may be performed according to any communication, diagnostic or other protocol. A transfer session may include one or more messages.

Update data may include instructions that alter the function of the ECU. By way of example, update data may be a firmware update. Alternatively, or additionally, update data may include instruction, or data that results in instructions, for a given action to be executed by a control system comprising the ECU. As such, a malicious entity may take advantage of the software update process for example by injecting messages into a data transfer session or by hijacking a data transfer session. For example, this may allow the attacker to render ECUs inoperable or update the firmware or configuration of the target ECUs in the vehicle. For example, an attacker may wait for a transfer session to commence and once such a session is detected, the attacker may attempt to use it for malicious purposes. The attacker may wait until the authentication stage (for example the "security access" stage) of the session is over which will allow the attacker to interfere with the session even though the attacker is not able to perform a proper authentication. Another example may be that the attacker may initiate a malicious transfer session. By way of example, the update data may include a firmware update and/or instructions that reconfigure the engine unit to be less efficient, overcharge or undercharge batteries, disable or improperly activate brake units, unlock car doors, change persistent records such as the odometer or the vehicle identification number (VIN), or disable dashboard warning lights.

SUMMARY

Embodiments of the disclosure detect anomalous diagnostic sessions, or transfer sessions in an in-vehicle network by checking transfer session messages against a session model that may include expected context and/or any other property of the transfer session. Embodiments of the disclosure may detect such anomalous sessions by tracking transfer sessions and comparing messages related to the transfer sessions to tracked session in order to determine whether the message is a valid message or an anomalous message.

BRIEF DESCRIPTION OF THE DRAWINGS

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale.

The subject matter regarded as the disclosure is particularly pointed out and distinctly claimed in the concluding portion of the specification. The disclosure, however, both as to organization and method of operation, together with objects, features and advantages thereof, may best be understood by reference to the following detailed description when read with the accompanied drawings. Embodiments of the disclosure are illustrated by way of example and not limitation in the figures of the accompanying drawings, in which like reference numerals indicate corresponding, analogous or similar elements, and in which:

FIG. 4 shows an exemplary list of tracked transfer sessions according to some embodiments of the disclosure;

DETAILED DESCRIPTION

In the following detailed description, numerous specific details are set forth in order to provide a thorough understanding of the disclosure. However, it will be understood by those skilled in the art that the present disclosure may be practiced without these specific details. In other instances, well-known methods, procedures, and components, modules, units and/or circuits have not been described in detail so as not to obscure the disclosure. Some features or elements described with respect to one embodiment may be combined with features or elements described with respect to other embodiments. For the sake of clarity, discussion of same or similar features or elements may not be repeated.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

A system and method according to some embodiments of the disclosure may include or use one or more computing devices in order to detect or identify security threats, detect or identify events or states that may jeopardize the security or proper function of a system and/or a network. In some embodiments and as described, one or more computing devices may be used in order to enforce security in network. For example, a system according to some embodiments may include one or more computing devices 100 as described herein. It will be understood the enforcing security as referred to herein may include any security related operations, for example, enforcing security in a network may include detecting threats, logging or recording threats or intrusions, alerting and so on.

Figure 1A:
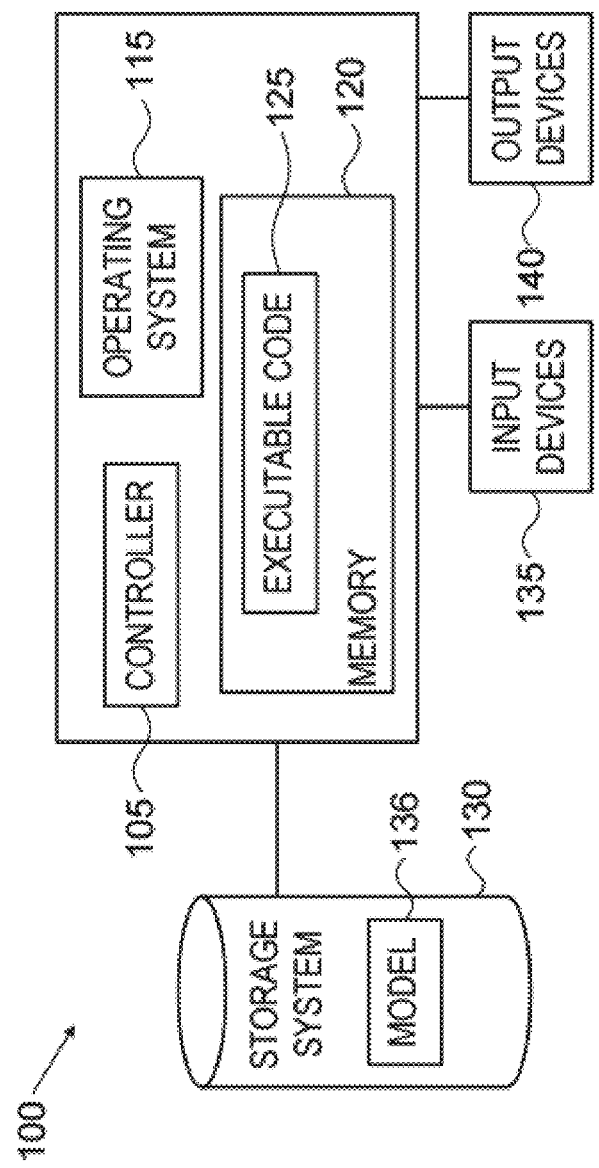
FIG. 1A shows high level block diagram of an exemplary computing device according to illustrative embodiments of the present disclosure.

Reference is made to FIG. 1A, showing a high level block diagram of an exemplary computing device according to some embodiments of the present disclosure. Computing device 100 may include a controller 105 that may be, for example, a central processing unit processor (CPU), a chip or any suitable computing or computational device, an operating system 115, a memory 120, executable code 125, a storage system 130 that may include a model 136, input devices 135 and output devices 140. Controller 105 (or one or more controllers or processors, possibly across multiple units or devices) may be configured to carry out methods described herein, and/or to execute or act as the various modules, units, etc. More than one computing device 100 may be included in, and one or more computing devices 100 may act as the components of, a system according to embodiments of the disclosure.

Figure 1B:
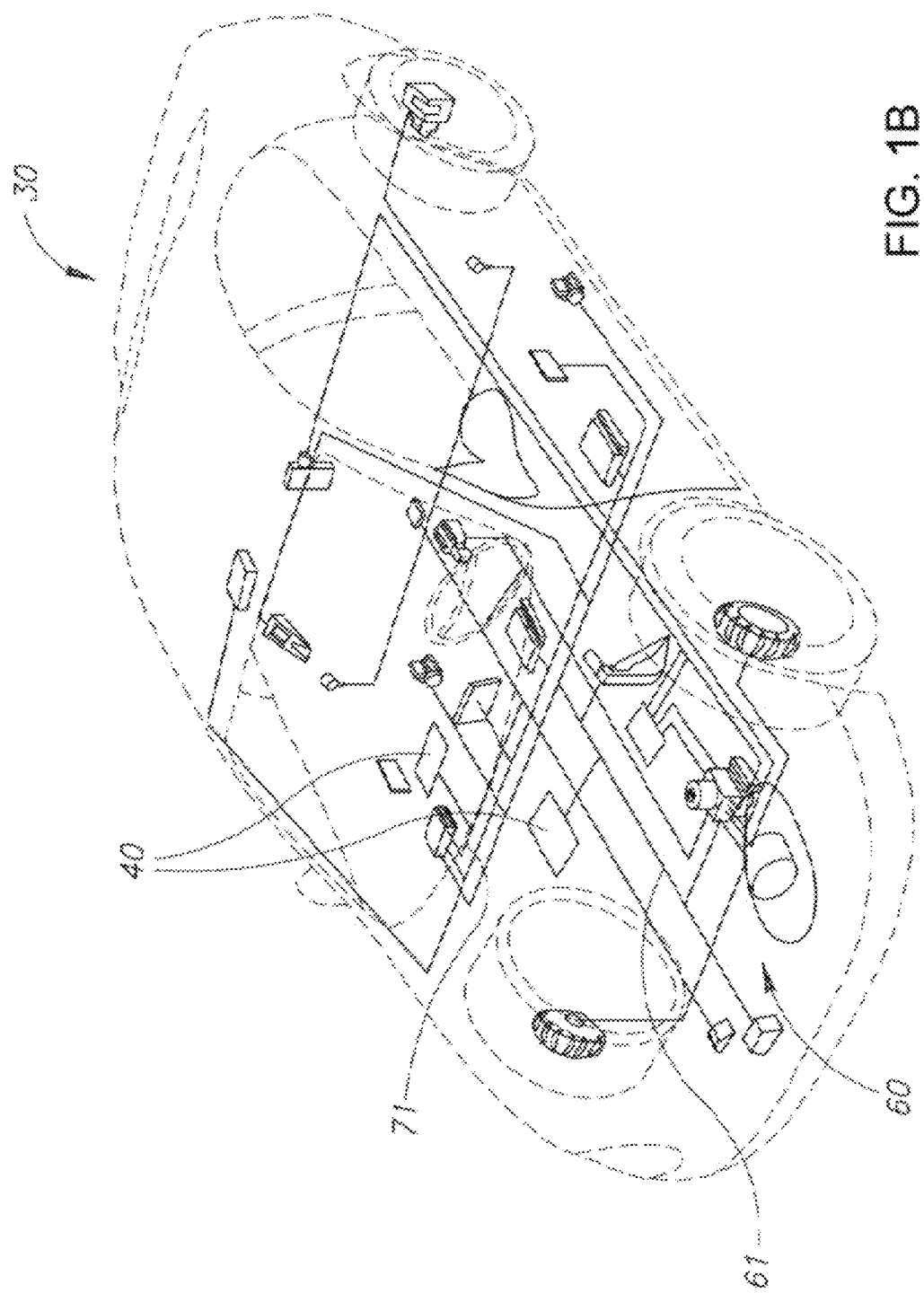
FIG. 1B schematically shows a vehicle and components of a system according to illustrative embodiments of the present disclosure.

For example, the components shown in FIG. 1B, e.g., on board, or in-vehicle, security enforcement units (SEUs) 40 (as further described herein) may be, or may include components of, computing device 100. For example, by executing executable code 125 stored in memory 120, controller 105, e.g., when included in a security enforcement unit as described, may be configured to carry out a method of enforcing security, signal analysis and/or cyber-security in a vehicle as described herein. For example, included in a security enforcement unit, controller 105 may be configured to enforce cyber-security in a vehicle, e.g., by: creating, storing and/or otherwise maintaining a timing, content, or other model for an expected behavior or for one or more messages communicated over an in-vehicle network; receiving a message sent from, or sent to, at least one of the plurality of ECUs; determining, based on the model, whether or not a behavior or, the received message, meets a criteria or complies with an expected timing, content, or other expected value or attribute; and, if the message does not comply with an expected value or does not meet a criteria, then performing at least one action related to the message, related to the in-vehicle network and/or related to the at least one ECU. For example, an action performed by controller 105 may be or may include, logging or recording an event (e.g., for further or future investigation or analysis), removing a message from a communication bus, modifying a message and/or changing a configuration of an in-vehicle network or of at least one of the ECUs connected to the in-vehicle network.

Operating system 115 may be or may include any code segment (e.g., one similar to executable code 125 described herein) designed and/or configured to perform tasks involving coordination, scheduling, arbitration, supervising, controlling or otherwise managing operation of computing device 100, for example, scheduling execution of software programs or tasks or enabling software programs or other modules or units to communicate. Operating system 115 may be a commercial operating system. It will be noted that an operating system 115 may be an optional component, e.g., in some embodiments, a system may include a computing device that does not require or include an operating system 115. For example, an SEU may be, or may include, a microcontroller, an application specific circuit (ASIC), a field programmable array (FPGA) and/or system on a chip (SOC) that may be used (e.g., as, or included in, an SEU) without an operating system.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be an application that enforces security in a vehicle as further described herein. Although, for the sake of clarity, a single item of executable code 125 is shown in FIG. 1A, a system according to some embodiments of the disclosure may include a plurality of executable code segments similar to executable code 125 that may be loaded into memory 120 and cause controller 105 to carry out methods described herein.

Storage system 130 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Content may be stored in storage system 130 and may be loaded from storage system 130 into memory 120 where it may be processed by controller 105. In some embodiments, some of the components shown in FIG. 1A may be omitted. For example, memory 120 may be a non-volatile memory having the storage capacity of storage system 130. Accordingly, although shown as a separate component, storage system 130 may be embedded or included in memory 120. Model 136 may be, or may include, a timing model that includes timing properties of messages, or expected behavior of messages, as described herein. As further described, model 136 may be, or may include, a content model that may include content attributes or properties of messages, or expected content related behavior of messages, as described herein. Storage system 130 may be a long term storage system, e.g., a disk or hard drive.

Input devices 135 may be or may include any suitable input devices, components or systems, e.g., a detachable keyboard or keypad, a mouse and the like. Output devices 140 may include one or more (possibly detachable) displays or monitors, speakers and/or any other suitable output devices. Any applicable input/output (I/O) devices may be connected to computing device 100 as shown by blocks 135 and 140. For example, a wired or wireless network interface card (NIC), a universal serial bus (USB) device or external hard drive may be included in input devices 135 and/or output devices 140. It will be recognized that any suitable number of input devices 135 and output device 140 may be operatively connected to computing device 100 as shown by blocks 135 and 140. For example, input devices 135 and output devices 140 may be used by a technician or engineer in order to connect to an SEU (that may be or may include computing device 100), download data from an SEU, read, or be presented with, data of the SEU, configure the SEU, update software and the like. Input devices or components 135 and 140 may be adapted to interface or communicate, with control or other units in a vehicle, e.g., input devices or components 135 and 140 may include ports that enable computing device 100 to communicate with an engine control unit, a suspension control unit, a traction control and the like.

A system according to some embodiments of the disclosure may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a plurality of components that include a respective plurality of central processing units, e.g., a plurality of SEUs as described, a plurality of SEUs embedded in an on board, or in-vehicle, system or network, a plurality of chips, FPGAs or SOCs, a plurality of computer or network devices, or any other suitable computing device. For example, a system as described herein may include one or more devices such as computing device 100.

An embodiment may include or use one or more computing devices in order to detect or identify security threats, detect or identify events or states that may jeopardize the security, or proper function, of a vehicle and/or an in-vehicle network and nodes attached thereto. In some embodiments and as described, one or more computing devices (e.g., computing devices similar to computing device 100) may be used or deployed in order to enforce security or correct functioning in an on board, or in-vehicle, network. It will be understood that enforcing security as referred to herein may include enforcing any security related measures or aspects, e.g., enforcing security in an in-vehicle network may include identifying threats, logging or recording events that may be related to threats or malicious activity, alerting, blocking messages, disabling or enabling components in a network and so on.

The terms "message" and "messages" as referred to and used herein may relate to any data unit communicated over a network. For example, a message may be an individual, or single data package, signal or frame as known in the art or a message may be a group or set of data units, packages or frames. Generally, signals as referred to herein may be data sent by a control or other unit. Signal values, as referred to herein, may be values sent by a control or other unit. For example, a unit or component that monitors and/or controls oil pressure in an engine may send signals that may be messages that include values representing engine oil pressure. A message as referred to herein may be one data unit or a group of data units that are sent to, or from, a specific node on a network, a message may be one data unit or a group of data units, packages or frames with a common identifier, or identity (both abbreviated "ID"), similar or same payload, sent or used for a common purpose and the like. When used herein, a message may refer to the general description or type for a group of messages, each with an individual specific instantiation of that message. E.g. a message having message ID XYZ may be used to refer to a type of message having that specific ID, and any individual message within that type.

Reference is made to FIG. 1B which schematically shows a vehicle and components of a system according to illustrative embodiments of the present disclosure. FIG. 1B schematically shows a vehicle 30 that includes an in-vehicle CAN 61. As shown, CAN 61 may include hardware communication buses 61 and 71. It will be understood that CAN 61 may include any number or types of hardware buses, e.g., in addition to hardware buses 61 and 71. As further shown, a plurality of SEUs 40 may be connected to CAN 61. SEUs 40 may operate to monitor communications over CAN 61, may detect anomalous messages and may perform actions with respect to anomalous messages.

SEUs 40 may monitor communications traffic over portions of CAN 61 to which they are connected to detect anomalous messages that propagate over the network and, optionally undertake actions to provide and maintain integrity and/or security of the network in the face of malfunctions, errors, and/or cyber-attacks. Although CAN is mainly referred to herein, it will be understood that any type of in-vehicle communication network may be used and that the scope of the disclosure is not limited by the type of the in-vehicle communication network used.

CAN 61 may include, for example, a high-speed CAN bus 61 and a medium-speed CAN bus 71 to which various components of vehicle 30 may be connected as nodes. The term "node" (or "network node") as used and referred to herein may relate, or refer to, any component connected to an in-vehicle network, e.g., a node as referred to herein may be any unit, device or system connected to an in-vehicle network and adapted to receive and/or transmit data or messages over the in-vehicle network.

An SEU 40, in accordance with an embodiment of the disclosure, may be connected to high-speed CAN bus 61 and to medium-speed CAN bus 71. Data may be transmitted between nodes connected to buses 61 and 71 using CAN frames as known in the art, which may be referred to herein as CAN packets, or CAN messages.

A CAN message in one example includes an 11 bit, or 29 bit extended, arbitration ID that may be used to identify the CAN message, a CAN message data field including a plurality of data bytes referred to as signals, and a cyclic redundancy check (CRC) code used for verifying an integrity of a message as known in the art. Other formats for a CAN message may be used. A CAN message arbitration ID may hereinafter be referred to as a CAN message ID or simply message ID. Typically, a given CAN message may be associated with at least one frequency of transmission that defines a corresponding expected repetition period (e.g. behavior) with which the given CAN message is usually transmitted or retransmitted over the CAN network. A specific CAN message, e.g., identified by its specific (possibly unique) CAN message ID, may be associated with more than one expected repetition periods. At any given time, the selection or identification of which of the more than one repetition periods associated with (or characterizing) a transmission of a given CAN message over a CAN network may be a function of, or based on, a context at the given time. The terms "vehicle context", "network context", "nodes context" or simply "context" as referred to herein may relate to a state, configuration or any operational or functional aspects of one or more of: a vehicle, an in-vehicle network, and/or one or more nodes connected to the in-vehicle network. Context and repetition period are further described herein below.

Although CAN messages and signals are mainly referred to herein, it will be understood that any types of messages and signals may be applicable and that the scope of the disclosure is not limited by the type or messages, signals or protocols used. For example, in some embodiments, an in-vehicle network, messages and/or signals may be according to, or as defined by, the Autostar standard known in the art, e.g., signals as referred to herein may be protocol data units (PDUs) as defined by the Autostar standard.

An anomaly as referred to herein may be any deviation from an expected behavior, result, sequence or event. For example, any of: an unexpected value in a message; an unexpected message or sequence of messages; an unexpected event; an unexpected content or timing of, or related to, a message may be an anomaly and/or may be identified, detected and/or determined as an anomaly by an embodiment. For example, expected values, messages, events, content and timing may be defined, included or represented in a model and, accordingly, an embodiment may identify unexpected timing, content or behavior by comparing attributes of messages to data in a model and thus determine, detect or identify an anomaly.

Determining, detecting or identifying an anomaly may include determining a message does not comply with a model as described herein. Accordingly, determining a message is anomalous or is related to an anomaly may include, or be based on, determining the message does not comply with a model. In some embodiments, determining a message is anomalous and/or is related to an anomaly may be based on considerations, calculations or logic other, or additional to, considerations, calculations or logic related to model.

Context, vehicle context or context of a vehicle (e.g., context of vehicle 30) as referred to herein may relate to a state of the vehicle, a state of the vehicle's in-vehicle communication network (e.g., a state of CAN 61) and/or a state of nodes connected to an in-vehicle communication network. For example, a state or context of vehicle 30 may be defined (and determined by an SEU 40) responsive to a value for each of at least one parameter, which one or more sensors or nodes in the vehicle provides, for example in a data portion of a CAN message that it transmits. The at least one parameter may for example, include one, or any combination of more than one of, vehicle's speed, acceleration, closing speed to a leading or trailing vehicle, engine revolutions per minute (rpm), engine temperature, oil pressure, hydraulic pressure, wheel traction, road condition, vehicle location optionally provided by a GPS signal, and/or weather condition. State or context of an in-vehicle network (e.g., of CAN 61), may by way of example, be defined (e.g., by an SEU 40) responsive to baud rate, which types of messages are being transmitted over the network, and/or which nodes in in-vehicle communication network (e.g., in CAN 61) are actively communicating over the network. State of in-vehicle communication network may also include a state or contents of a communication session of which the CAN message is a part.

A context or state of a node may be, for example, an operational stage or phase, e.g., the node is rebooting, the node is in an initialization sage, the node is restarting and so on. A context or state of a node may be related to an error that occurred at the node or network or any other aspect related to the functioning of the node or network. Accordingly, an SEU 40 may determine, detect or identify a context based on at least one of: a state or other attribute of a vehicle, an in-vehicle network, and a node connected to the network. For example, by examining messages communicated over an in-vehicle network (and, as described, an SEU 40 may receive any of, or even all, messages sent over an in-vehicle network) an SEU 40 may know, or determine or identify, the state of the vehicle itself, nodes on the in-vehicle network as well as the state or context of any one of the nodes connected to an in-vehicle network.

SEU 40 may receive data from components in vehicle 30 and calculate, determine or deduce a context, possibly based on more than one input from more than one component. For example, a first context may be determined by SEU 40 if the speed of the vehicle is 40 mph and the rpm is 1,500 and a second, different context may be determined by SEU 40 if the speed of the vehicle is 10 mph and the rpm is 1,500. A context may be determined, by SEU 40, based on a lookup table as known in the art, e.g., a table that associates a set of states of, or signals received from one or more of: of a vehicle, an in-vehicle network and nodes on the in-vehicle network with a state. Accordingly, any set of states and/or set of conditions and/or set of signals received may be translated, or used for determining a context as described.

A model used by an SEU 40 for detecting anomalies as described, may be, or may include, any content, data or information related to messages. Specifically, a session model may be, or may include any data or values related to aspects of the transfer session.

Figure 1C:
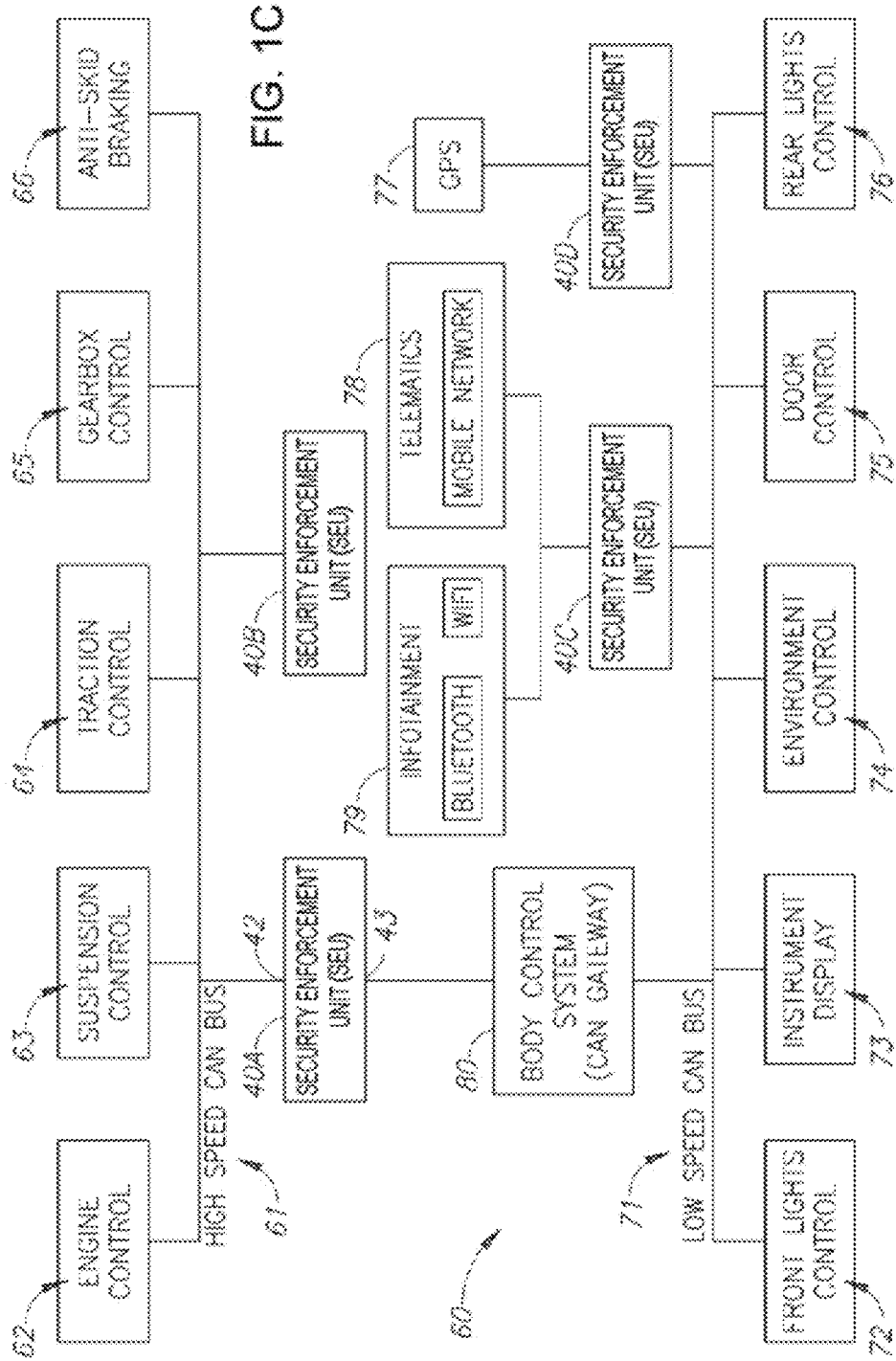
FIG. 1C shows a schematic block diagram of components of a system according to illustrative embodiments of the present disclosure.

Reference is made to FIG. 1C that shows a schematic block diagram of components of a system 60 according to illustrative embodiments of the present disclosure. As shown, system 60 may include an in-vehicle CAN 61 communication network analyzed or protected by a set of SEUs (e.g., SEU similar to SEUs 40), in accordance embodiments of the present disclosure. FIG. 1C shows a schematic block diagram of portions of an in-vehicle communication network that may be CAN 61 and CAN 71. As shown, an in-vehicle communication network that may include two portions (e.g., CAN 61 and CAN 71) may be protected by a set of SEUs 40A, 40B, 40C and 40D that may protect the network and specific control systems included in vehicle 30. While in one embodiment SEUs are shown analyzing a network, other units may be used, for example in different contexts.

The control systems and/or their respective components may be connected to, for example, high-speed and medium-speed CAN buses (or other bus bars or systems as known in the art) 61 and 71. For example, medium-speed CAN bus 71 may be a class B CAN bus that operates at data transmission speeds of up to 125 kilobits per second (Kbps), to support communications between nodes, such as components of vehicle body control systems and infotainment systems that can function properly receiving and transmitting data at relatively low data transmission rates. By way of example, medium-speed CAN bus 71 is schematically shown connected to nodes that are, as shown, headlights 72, instrument display 73, environment control 74, door control 75 and rear light control 76.

An infotainment system 79 including Bluetooth and Wifi communication interfaces and a telematics system 78 that provides a communication interface to mobile phone networks and supports hands free calling may be connected, as shown, to medium-speed CAN bus 71 via SEU 40C discussed below. A GPS receiver 77 may optionally be separated from telematics system 78, and may be connected to medium-speed CAN bus 71 via SEU 40D as shown.

High-speed CAN bus 61 may be a class C CAN bus that operates at data transmission speeds of up to 1 megabits (MB) per second to support communications between nodes such as sensors and ECUs of various control systems that may require relatively high-speed transmission of data between the nodes to operate properly. High-speed CAN bus 61 is schematically shown connected to engine control 62, suspension control 63, traction control 64, gearbox control 65, and braking control (anti-skid braking) control 66. As shown, high-speed CAN bus 61 may be connected by a body control system (CAN gateway) 80 to medium-speed CAN bus 71. Each of SEUs 40A, 40B, 40Ca and 40D may include, or be connected to, one or more ports for receiving and transmitting data from/to busses it is connected to. For example, and as shown, SEU 40A may include ports 42 and 43 enabling SEU 40A to communicate over CAN bus 61 (using port 42) and over CAN bus 71 (e.g., using port 43 to communicate with CAN bus 71 via CAN gateway 80. In other embodiments, CAN gateway 80 may include a security unit such as SEU 40A. In some embodiments, SEU 40A or another security unit may monitor traffic or messages on a first and second network portions of an in-vehicle communication network; determine whether or not a first message detected on a first network portion is anomalous based on at least one of: an attribute of a second message detected on the second portion and an absence of a second message from the second network portion over a predefined time period and, if it is determined the first message is anomalous, security unit 81 may perform at least one action. Security unit 81 may be located or installed inside CAN gateway 80 as shown or anywhere else in a system such it may receive messages from a plurality of network segments, e.g., receive messages from CAN 61 and from CAN 71.

In some embodiments, an in-vehicle network (e.g., a network including CAN 61, CAN 71 and nodes as described and shown, e.g., in FIG. 1C) may be monitored and/or protected by a set or plurality of, SEUs 40, e.g., SEUs 40A, 40B, 40C, and 40D as shown. It will be understood that any number of SEUs 40 may be included in a system.

In some embodiments or in an exemplary configuration, and as shown by FIG. 1C, SEU 40A may be a two communication port module connected between high-speed bus CAN 61 and CAN gateway 80 that connects the high-speed bus CAN 61 to medium-speed bus CAN 71. SEU 40B may be a single communication port module connected to high-speed bus CAN 61. Infotainment system 79 and telematics system 78 may be connected, via SEU 40C, to medium-speed bus 71 and GPS receiver 77 may be connected via SEU 40D to medium-speed bus 71. SEU 40A may operate in accordance with an embodiment of the disclosure to monitor CAN messages that are transmitted between high-speed bus CAN 61 and CAN gateway 80 and to detect anomalous messages that are transmitted to pass through CAN gateway 80 from one to the other of buses CAN 61 and CAN 71. SDU 40B may be connected to high-speed CAN bus 61 to eavesdrop on communications over the high-speed bus and to monitor and detect anomalous messages propagating in the high speed bus. SEUs 40C and 40D may be configured, or may operate, to monitor and detect anomalous messages that attempt to enter in-vehicle communication network 60 via external interface units, devices, systems or modules, e.g., via Bluetooth, WiFi, and/or mobile telephone communication interfaces.

An SEU 40 may, in response to detecting an anomalous message, operate to undertake any of various response actions to protect system 60 (or the network and components therein) from possible damage by the anomalous message. Response actions may, by way of example, include: blocking the message, delaying the message; limiting the frequency of the message, logging the message into a memory included in an SEU 40; and/or raising an alert responsive to the message. A response action or actions may optionally be dependent on a level of confidence the SEU 40 may attribute to the detected anomaly. For example, anomalies detected with a relatively high degree of confidence may cause an embodiment to block messages as described herein or to isolate a component for an in-vehicle network, while anomalies detected with a relatively low degree of confidence may only be logged. The level of confidence may be dependent on a combination of optionally more than one factor such as the type of message, its ID, the type of the anomaly detection method used and detection specific parameters for the anomaly such as timing information for the message. An SEU 40 in accordance with an embodiment of the disclosure is not limited to a number of communication ports shown in FIG. 1C and may have a number of communication ports different from the numbers shown in FIG. 1C, e.g., an SEU 40 connected to five portions of an in-vehicle network may include five communication ports that may be similar to ports 42 and 43.

Although in FIGS. 1B and 1C SEU 40 devices, units or modules are schematically shown as separate components that appear to be hardware components, an SEU 40 in accordance with an embodiment of the disclosure may be a "virtualized SEU" defined by a software component included in a node on, or connected to, an in-vehicle communication network (e.g., a node on CAN 61). For example, CAN gateway 80 may be, or may include components of, computing device 100, e.g., include computer executable instructions and data (e.g., executable code 125 and memory 120), or CAN gateway 80 may include a combination of software and hardware that provide SEU 40 functionalities in accordance with an embodiment of the disclosure. In some embodiments, an SEU 40 may also be integrated into the hardware of a node, e.g., in the hardware of telematics unit 78. It will be understood that any component, unit, system or device connected to an in-vehicle network and including at least a controller (e.g., a controller 105), a memory (e.g., a memory 120) and computer instructions (e.g. executable code 125) may be used as, or may include, an SEU 40 as described herein.

Figure 2:
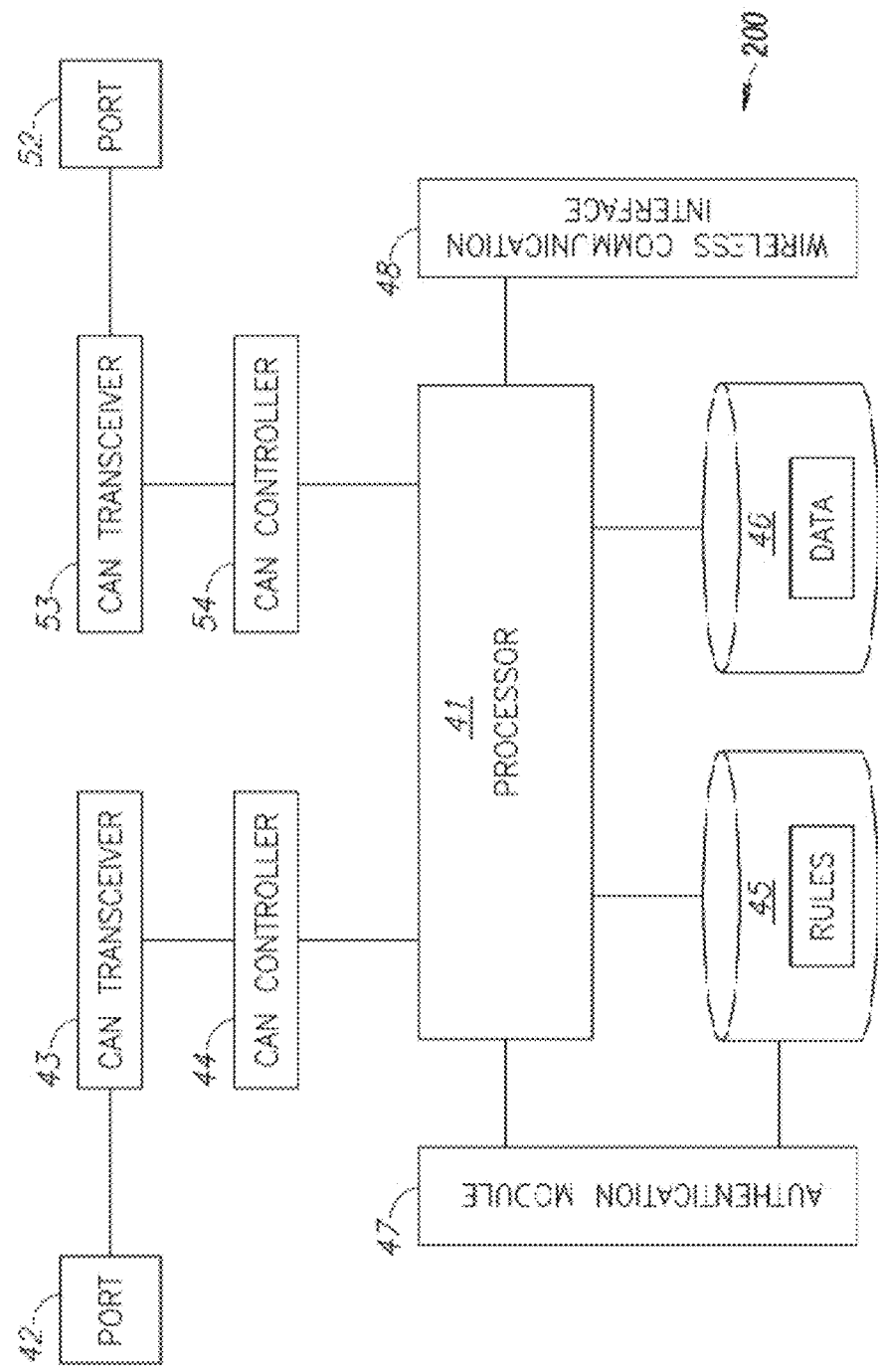
FIG. 2 shows a schematic block diagram of components of a system according to illustrative embodiments of the present disclosure.

Reference is made to FIG. 2 that shows a schematic block diagram of components of a system 200 according to illustrative embodiments of the present disclosure. More specifically, FIG. 2 shows components that may be included in an SEU according to some embodiments of the disclosure. For example, SEUs 40A, 40B, 40C and 40D described herein may be, may include, or may be similar to, system 200. It will be understood that various embodiments or configurations may be contemplated, e.g., an SEU in some embodiments may include components not shown in FIG. 2, an SEU according to other embodiments may include only a sub-set of the components shown in FIG. 2 and/or, in some embodiments, an SEU may include two or more similar components, e.g., an SEU may include two or more wireless communication interfaces (e.g., as shown by block 48 and further described herein).

As shown, system 200 (e.g., an SEU) may include a processor 41 and a number of communication ports, e.g., communication ports 42 and 52 as shown. Communication ports such as communication ports 42 and 52 may be used for, or adapted to, transmitting messages to and receiving messages from a CAN bus or a CAN node to which the SEU is connected. For example, in FIG. 1C communication port 42 of SEU 40A is connected to high-speed bus CAN 61 and port 52 of the SEU is connected to CAN gateway 80. As shown, port 42 may be connected to processor 41 by a CAN transceiver 43 and a CAN controller 44. Transceiver 43 may convert bits in a CAN message, which may be serially received from high-speed bus CAN 61 at port 42, from a CAN format to a format used by the SEU and forwards the bits to CAN controller 44. CAN controller 44, which may be embedded into the processor 41, may store the bits until all the bits in, or of, a CAN message to which the bits belong are received, and the complete message is assembled. CAN controller 44 may forward an assembled message to processor 41 for processing in accordance with an embodiment of the disclosure. CAN controller 44 may receive bits generated by processor 41 for transmission from an SEU to high-speed CAN bus 61 in a CAN message, and may forward the bits to transceiver 43 for conversion from an SEU format in which the bits are generated to a CAN format. Transceiver 43 may forward the bits in the CAN format for transmission to CAN bus 61 via port 42.

Port 52 may be connected to processor 41 by a transceiver 53 and controller 54 and may operate to transmit CAN messages to and from CAN gateway 80. Processor 41 may include any processing and/or control circuitry known in the art and may, by way of example, include any one or any combination of more than one of a microprocessor, an ASIC, FPGA and/or s SOC.

As shown by FIG. 2, an SEU may include an authentication module 47 for authenticating messages the SEU receives and a wireless communication interface 48 for communicating with entities outside of, or external to, an in-vehicle communication network (e.g., external to CAN 61) via a wireless communication channel. For example, wireless interface 48 may provide connectivity to a WiFi network, and/or a Bluetooth channel and/or a mobile phone network such as a 3G network. In some embodiments, e.g., in the absence of such a wireless capability, an SEU in accordance with an embodiment of the disclosure may communicate with an outside or external entity over an existing vehicle connection to the cloud. This may be performed by tunneling via a CAN bus, such as CAN bus 71 or 61 to an ECU in the in-vehicle network that may have connectivity to the cloud. For example, tunneling may be implemented by reading and writing PIDs according to the Unified Diagnostic System Standard or by using any other protocol supported by the CAN bus.

Processor 41 may process a message it receives via port 42 or port 52 in accordance with computer executable instructions stored in a memory 45 and data optionally stored in a data memory 46 to determine whether or not a message is an anomalous message (or is related to an anomaly) and optionally in accordance with a vehicle context during which the message is received. The vehicle context may be determined by an SEU responsive to data included in messages that SEU receives and which the SEU may store as data in memory 46. Memory 45 and/or memory 46 may include primary and/or secondary memory used by an SEU and although memories 45 and 46 are schematically shown as separate units, these memories may be included in a same unit and/or may be embedded into processor 41.

Figure 3:
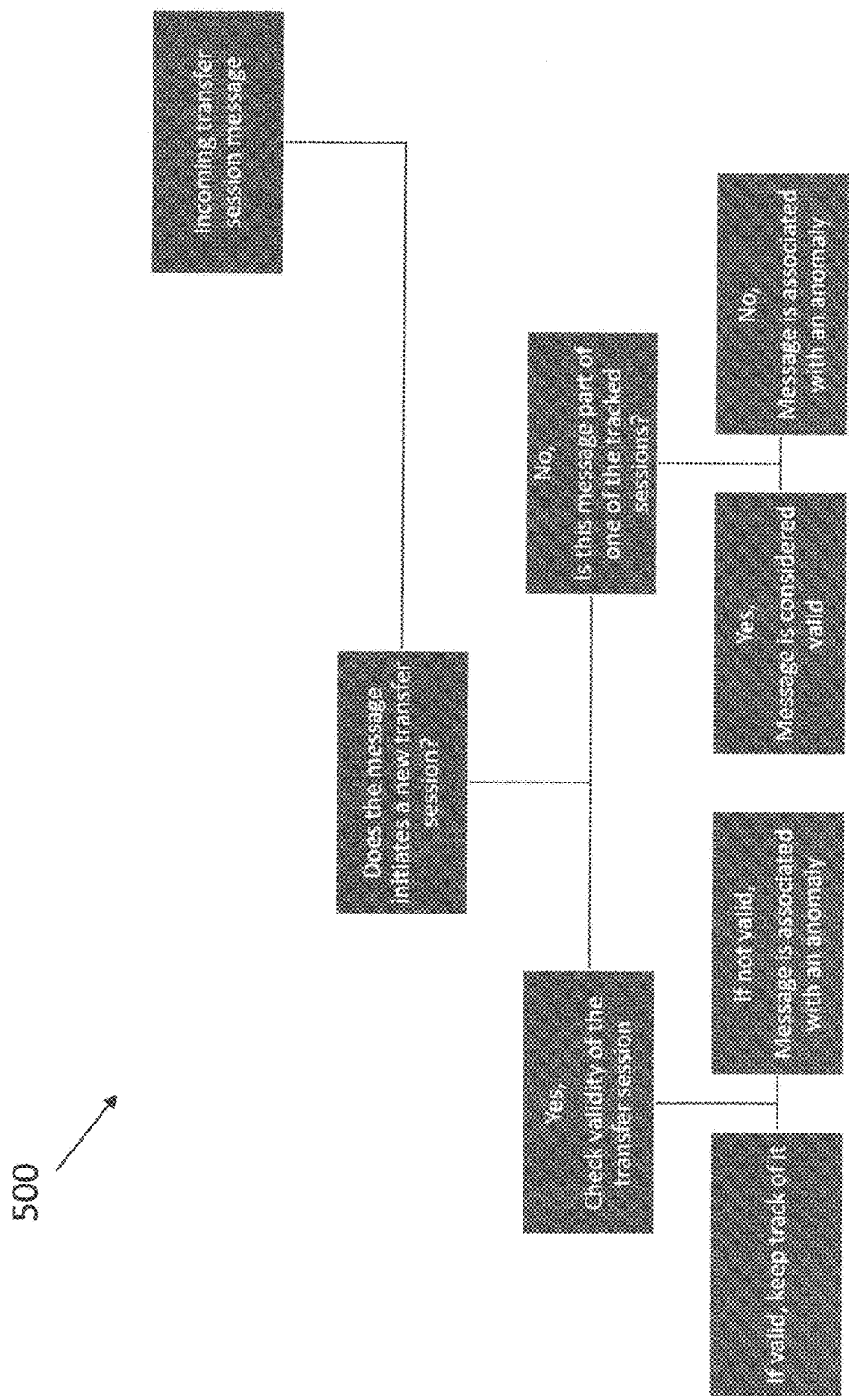
FIG. 3 shows a flowchart of a method according to illustrative embodiments of the present disclosure.

Reference is made to FIG. 3 that show flowchart 500 of a method according to illustrative embodiments of the present disclosure. As with other flowcharts and embodiments described herein, processing units other than an SEU may be used, and messages other than CAN messages may be used. Furthermore, specific data constructs are described, but as with other embodiments described herein, other data constructs may be used. For example, flow or method 500 may be carried out by processor 41 included in an SEU 40 as described. Flow 500 may be used, or carried out, by some embodiments in order to determine whether or not a CAN message propagated over an in-vehicle communication network is an anomalous message, and/or is related to an anomaly, in accordance with some embodiments of the disclosure. A message may be referred to as anomalous if it is anomalous or it indicates an anomaly.

An SEU 40 in accordance with some embodiments of the disclosure may adapt its detection parameters over time in order to reduce its false positive and/or false negative detection rates optionally by receiving feedback in the form of configuration updates to parameters or values in a model and/or other attributes of the SEU 40. Several SEUs, each installed in a different network may be linked together by at least one common external hub. The hub may orchestrate and manage the parameters of the SEUs in all these networks. For example, several vehicles in a fleet may all be communicating with the same hub, which may issue configuration updates to all the SEUs in the fleet. The hub may be cloud based.

The hub may collect information from the vehicle about anomalies and details regarding the specific messages involved in the anomaly decision making process of SEUs 40 that communicate with the hub. The hub may aggregate and process the information in order to fine tune the parameters of the SEUs, using the above mentioned configuration updates. The hub may optionally provide an overview of the cyber security and/or operational status of the entire fleet to the fleet's operators.

Operations performed by an SEU 40 as described herein may be performed in real-time. Generally, "real-time" (also known and referred to in the art as "realtime", or "real time") as referred to herein relates to processing or handling of events and acting as described at the rate or pace that the events occur, identified or received (possibly defined by human perception). For example, an SEU 40 according to embodiments of the disclosure may process messages at the rate or pace messages are received. An SEU 40 may act in real-time, e.g., within milliseconds or other very brief periods after a message is transmitted on an in-vehicle network so that an action related to a message or an anomaly is performed virtually immediately. For example, an SEU 40 may, in real-time, determine a deviation from a proper diagnostic protocol, timing constraint or from an expected content in a message and alert, disable a node, or block messages, substantially immediately when a deviation or anomaly occurs, or is detected.

An embodiment for providing security to an in-vehicle communication network may include a non-transitory computer readable medium or computer storage medium (e.g., memory 120 or memory 45) including instructions (e.g., executable code 125) that, when executed by at least one processor (e.g., controller 105), cause the at least one processor to perform methods discussed herein, such as cyber-security transfer session based enforcement operations for, or in, a vehicle. The operations performed by a processor may include maintaining a transfer session model of expected behavior of messages, diagnostic sessions or other data communications over the in-vehicle communication network.

If a message does not comply with a model (or specification, rules or criteria in a model as described) then an SEU 40 may perform at least one action related to the message. An action performed by an SEU 40 when detecting an anomaly (e.g., a deviation from a timing constraint) may, for example, include: disabling a component connected to the network, disconnecting or isolating a portion of an in-vehicle network (or other network) from the rest of the in-vehicle network (or other network), disconnecting or isolating a node on an in-vehicle network from the rest of the in-vehicle network, activating a component connected to the network, blocking a message, avoiding routing or forwarding a message, e.g., avoid, or refrain from, forwarding or routing a message to its destination or to a specific portion of an in-vehicle network, delaying a message, limiting a frequency of a message type, logging a message and warning or alerting. In some embodiments, an action performed by an SEU 40 may include sending, over an in-vehicle network, an error or warning message that may cause nodes on the in-vehicle network to ignore or disregard a specific message. For example, a protocol adhered to by nodes on an in-vehicle network may enable sending (or broadcasting) a special message that can cause nodes to refrain from receiving or processing messages (e.g., ignore or disregard a specific number of past or future messages or ignore messages sent in a specified time period).

Blocking a message may include destroying a message being communicated over a network or communication bus while the message is communicated. For example, in some embodiments, in order to block a message, an SEU 40 may send a CAN error frame, signal or message on a network of bus that may destroy another message that is currently communicated. In some embodiments, an SEU 40 may corrupt (or destroy) a message while it is being transmitted on the bus by sending data (e.g., one or more dominant bits as known in the art) on the bus during the transmission of the message.

Disabling a component connected to the network may be done, e.g., by an SEU 40, by communicating with the component and configuring the component. For example, SEU 40C may send, over an in-vehicle network and to infotainment 79, a message that will cause infotainment 79 to shut itself off.

Any protocol or message types or formats needed in order to communicate with nodes on an in-vehicle network may be stored, e.g., in storage 45 or in storage system 130 and, accordingly, an SEU 40 may be able to readily and freely communicate with nodes on an in-vehicle network. Accordingly, an SEU 40 may configure or re-configure nodes, may obtain data or information from nodes (e.g., their state and the like) and may, for example, turn nodes on or off.

Disconnecting or isolating a portion of an in-vehicle network from the rest of the in-vehicle network may be done or achieved by an SEU 40 by configuring nodes on an in-vehicle network. For example, in order to isolate the low speed bus 71 shown in FIG. 1C, SEU 40 may send a message to CAN gateway 80 instructing CAN gateway 80 to prevent any data from flowing between low speed bus 71 and high speed bus 61 thus effectively isolating low speed bus 71 from the network. Accordingly, an embodiment (e.g., a processor in an SEU 40) may be configured to isolate a portion of a network (e.g., a portion of an in-vehicle network such as high speed CAN bus 61) from the rest of the in-vehicle communication network in order to isolate a source of a message related to an anomaly.

A first SEU 40 may disconnect or isolate a portion of an in-vehicle network by communicating with another, second SEU 40. For example, to isolate low speed bus 71, SEU 40C may instruct SEU 40D to block all messages from low speed bus 71. Disconnecting or isolating a node of an in-vehicle network from the rest of the in-vehicle network may be done by configuring a component on the network, e.g., configuring an SEU 40. For example, to disconnect GPS 77 from the network, SEU 40C may instruct SEU 40D to block (or drop as known in the art) messages to/from GPS 77.

Activating a component connected to the network may done or achieved, by an SEU 40 by sending a message to the component. For example, using protocols and message formats stored as described, an SEU 40 may send a message to environment control 74 in order to turn the air conditioning on or off. Blocking a message may include causing a component (e.g., CAN gateway 80) to selectively block (e.g., drop as known on the art) messages. Blocking messages may be done by an SEU 40. For example, SEU 40C may selectively prevent messages from telematics 78 from reaching an in-vehicle network (e.g., based on message IDs SEU 40C may drop messages coming from telematics 78 but forward messages coming from infotainment 79). Delaying a message may include storing the message and transmitting the message at a later time. For example, SEU 40C may store a message received from telematics 78 and, possibly based on a condition or state (e.g., when a state of vehicle 30 changes from A to B) transmit the message to its destination. Limiting a frequency of a message may be based on the type (e.g., ID) of the message. For example, SEU 40C may block some of the messages arriving from door control 75 such that the frequency of these messages on the in-vehicle network is reduced or lowered.

Logging a message may include storing any information related to a message. Information or data logged or stored as described may include forensic information that may include, for example, description or attributes of previous messages sent or seen on a network, contexts (e.g., a number of contexts in a context vector) of a vehicle, network or nodes, and any other parameters or values that can help an offline analysis of an attack. Logged, stored or recorded information may include any, or all of the, information required in order to recreate an in-vehicle decision regarding a message or attack in an offline procedure. For example, by storing all messages sent over an in-vehicle network, contexts and data internal to an SEU 40, the performance and decision making of an SEU may be examined and/or debugged as known in the art. Logging, storing or recording information as described may be done in a secure portion of a system or network. For example, a Hardware Security Module (HSM) may be connected to an in-vehicle network and may be used to store, log or record data such that only authorized entities (e.g., a technician or an SEU 40) may be able to access stored data.

For example, an SEU 40 may store, in storage system 130, the time a message was received, the source and destination of the message, some or all of the content (payload) of the message and any other information or data related to the message. Warning or alerting may include sending a text message, electronic mail or any other message. For example, SEU 40b may send a message to telematics 78 that will cause telematics 78 to send a text message or an email to a specified recipient list. Warning may include, or be done, using components in a vehicle. For example, SEU 40C may cause (e.g., by sending a message as described) infotainment 79 do display a warning message, sound an alarm and so on.

An SEU 40 may identify an event and may identify or determine an anomaly based on the event and/or determine a message is related to an anomaly based on the event. An event may be identified or detected based on a message. For example, opening a door of vehicle 30 may be an event that may cause door control 75 to send a "door opened" message over CAN 61 and/or CAN 71, receiving a "door opened" message may cause an SEU 40 to identify the event. In some embodiments, an SEU 40 may receive any or all messages sent over an in-vehicle network and, accordingly, SEU 40C may receive the "door opened" thus identifying, detecting or determining a "door opened" event occurred. Logic in, or of, an SEU 40 (e.g., encoded in executable code 125) may cause the SEU 40 to determine, detect or identify an anomaly based on events. For example, events may cause an SEU 40 to update or modify a state of the vehicle, nodes or network as described. For example, upon receiving the "door open" message, an SEU 40 may change the state or context of vehicle 30 to some predefined state or context and, as described, subsequent messages sent over the in-vehicle network may be processed in accordance with the state or context as updated. For example, since typically a vehicle is stationary when its doors are open, messages received from traction unit 64 (e.g., indicating speed or other traction aspects) or messages received from suspension control 63 (e.g., indicating movement of the vehicle) may be treated, or identified, by an SEU 40 as an anomaly. Of course, a state may be updated (or re-updated or reinstated). For example, when vehicles 30's door is closed, a "door closed" message may cause an SEU 40 to update a context or state of vehicle 30, e.g., revert to the context that was in effect before the door was opened.

For example, an SEU may detect an anomaly (e.g., a violation or breach of a transfer session as described) and may provide an indication and/or explanation for, or of, the violation.

Determining that an event or message requires only reporting or advising may be based on a context or state. For example, an event may be only reported as described if the vehicle is moving (a first context) but may cause an SEU to perform actions in addition to (or even instead of) reporting if the vehicle is stationary (a second, different context), e.g., since for example initiating a secure diagnostic session is unexpected or unlikely if the vehicle is moving.

Determining that an event or message requires only reporting or advising may be based on a number of events or messages, e.g., a specific set or sequence of messages.

Detecting or identifying anomalous messages and/or messages related to an anomaly may be according to, or based on, content and an event. For example, in some embodiments, a transfer session may be regarded by an embodiment as valid (or complying with a model) when detected or seen after a first event is detected, but the same transfer session may be regarded, or identified, by an embodiment, as related to an anomaly when detected or seen after a detection of a second, different, event or before detecting a third event. For example, a transfer session such as a diagnostic session that uploads new firmware or changes configuration of an ECU may be identified as related to an anomaly if the vehicle is currently in motion. Another example may be that a transfer session that instructs the brakes to bleed while the vehicle is in motion may also be regarded as related to an anomaly.

An embodiment may keep track of transfer sessions in the vehicle. When observing a message that is a part of transfer session, an embodiment may determine whether this message is a valid part of the transfer session and not injected by, for example, a compromised ECU.

For example, an embodiment may keep track of transfer sessions by listing the source port at which the session messages are received at and the destination ECU or CAN ID for each transfer session (as illustrated in FIG. 4) as each transfer session is between two fixed entities in the network. When observing a transfer session message, an embodiment may check whether this message initiates a new transfer session or is it a part of a presumably existing transfer session, for example based on the protocol used in the transfer session and on the source port and destination ECU or CAN ID of the message. If the message initiates a new transfer session, the embodiment may determine whether this session is a part of an anomaly according to the state of the vehicle and/or other conditions on the type of transfer session. An embodiment may keep track of this new transfer session. If the message is not initiating a new session but it is also not part of any of the tracked sessions, an embodiment may associate this message with an anomaly.

In some embodiments, in order to decide whether or not a message is a normal, valid or legitimate message, a security system may monitor two or more network segments, and enforce consistency as described herein. Generally, an anomaly related to inconsistency as referred to herein may be any anomaly detected or identified based on content, IDs, timing or order of messages on at least two different network segments or portions as described herein.

For example, an embodiment may monitor traffic on a first network segment and keep track of diagnostic sessions originating from this network segment. When observing a diagnostic message on a second network segment, an embodiment may determine whether this message is a part of any of the tracked diagnostic sessions and check for consistency, e.g., verify that all diagnostic messages of the same session are coming from the same source port and not injected by, for example, a compromised ECU on a network segment that is different from the network segment of the legitimate diagnostic session source.

For example, an embodiment may detect that a compromised telematics module may attempt to inject messages into an existing diagnostic session initiated by a diagnostic tester connected to the OBD port of the vehicle, where the OBD and the telematics are connected to different ports of the SEU.

An embodiment may keep track of error messages used in the protocol of the transfer session. An error message may be associated by an embodiment with an anomaly.

An embodiment may detect messages as anomalies if they are not compliant with the diagnostic specification of the vehicle or of the target ECU. For example, a message may be detected as anomalous if it attempts to access a non-valid diagnostic service or pass a non-valid parameter to one of the valid services.

An embodiment may keep track of the sequence number of the messages in the transfer session. An embodiment may associate a message with an anomaly if the sequence number of the message is not according to the expected number. For example, an embodiment may detect duplicate sequence numbers of transfer session messages as anomalies.

An embodiment may determine a component connected to in-vehicle communication network is malfunctioning based on one or more messages and the embodiment may generate an indication related to the malfunctioning component. For example, an indication related to the malfunctioning component may be stored or recorded in storage system 130 (e.g., for later offline examination) or an indication related to the malfunctioning component may be a message presented to a driver or technician, e.g., an SEU may use infotainment system 79 as described herein in order to provide an indication related to the malfunctioning component.

For example, based on a message received from a component or node, and based on a data sheet of or other data or description related to, the component or node (e.g., stored in storage system 130), SEU 40A may examine a message received from a node and determine or identify a fault. For example, SEU 40A may receive a message from suspension control 63, compare the payload in the message to a payload stored in storage system 130 and determine, based on a difference between the received and stored payloads, that the suspension system is not operating properly, Since both data in storage system 130 and logic in an SEU 40 may be updated at any time (e.g., using input and output devices 135 and 140 as described), an embodiment may be updated and adapted to handle faults as they are discovered.

A device in an embodiment (e.g., an SEU 40) may calculate a confidence level of a message being related to an anomaly and may perform an action based on the confidence level. For example, and as described, an action performed upon, or in response to, detecting or identifying an anomaly may be based on a confidence level. Accordingly, upon detecting, determining or identifying an anomaly, a system and method according to some embodiments may perform one or more actions as described. A level of confidence that an anomaly was indeed detected may be dependent on a combination factors, e.g., the node who sent the relevant message, the type of message, the message ID and/or the specific method used for detecting the anomaly.

A device in an embodiment (e.g., an SEU 40) may calculate a confidence level or value of a message being related to an anomaly based on a ratio of anomalous message (or breaches or violations of thresholds) to a time period. For example, in a simplified case, if a time interval different from an expected time interval (a threshold breach) is identified six ("6") time in a ten ("10") seconds time period of then the confidence level related to determining an anomaly that may be calculated or determined (e.g., by 6/10=0.6) may be greater than the confidence level determined for the same threshold if three ("3") breaches occur in a ten ("10") seconds time period (e.g., 0.6>0.3). Any other methods or calculations may be used, e.g., by an SEU 40, in order to calculate or determine a confidence level or value based on the number of anomalies or thresholds breaches and the relevant time period.

In some embodiments or cases, an action may be, or may include, an explanation, advice or information that may be provided or presented to a user (e.g., to a driver or technician). For example, an SEU may present information to a driver or technician using infotainment system 79, for example, by sending a message to infotainment system 79 that causes infotainment system 79 to display advisory or explanatory information.

In the description and claims of the present application, each of the verbs, "comprise" "include" and "have", and conjugates thereof, are used to indicate that the object or objects of the verb are not necessarily a complete listing of components, elements or parts of the subject or subjects of the verb. Unless otherwise stated, adjectives such as "substantially" and "about" modifying a condition or relationship characteristic of a feature or features of an embodiment of the disclosure, are understood to mean that the condition or characteristic is defined to within tolerances that are acceptable the embodiment as described. In addition, the word "or" is considered to be the inclusive "or" rather than the exclusive or, and indicates at least one of, or any combination of items it conjoins.

Descriptions of embodiments of the disclosure in the present application are provided by way of example and are not intended to limit the scope of the disclosure. The described embodiments include different features, not all of which are required in all embodiments. Some embodiments utilize only some of the features or possible combinations of the features. Variations of embodiments of the disclosure that are described, and embodiments including different combinations of features noted in the described embodiments, will occur to a person having ordinary skill in the art. The scope of the disclosure is limited only by the claims.

Unless explicitly stated, the method embodiments described herein are not constrained to a particular order in time or chronological sequence. Additionally, some of the described method elements may be skipped, or they may be repeated, during a sequence of operations of a method.

While certain features of the disclosure have been illustrated and described herein, many modifications, substitutions, changes, and equivalents may occur to those skilled in the art. It is, therefore, to be understood that the appended claims are intended to cover all such modifications and changes as fall within the true spirit of the disclosure.

Various embodiments have been presented. Each of these embodiments may of course include features from other embodiments presented, and embodiments not specifically described may include various features described herein.

The invention claimed is:

1. A method of monitoring communications propagating in an in-vehicle communications network of a vehicle, the method comprising:
   monitoring messages transmitted over at least a portion of the in-vehicle network;
   determining if the transmitted messages are indicative of at least one current data transfer session being conducted over the in-vehicle network;
   comparing at least one feature of a given message of the transmitted messages to at least one expected feature of a message comprised in a model of the at least one current data transfer session to determine whether or not the at least one feature of the transmitted message is expected;
   determining that the given transmitted message is an anomalous message if the feature of the given transmitted message is determined to be unexpected;
   wherein comparing the at least one feature comprises determining whether or not the given transmitted message is configured to initiate a data transfer session different from the determined at least one current data transfer session; and
   wherein if the given transmitted message is determined to be configured to initiate a different data transfer session, comprising determining that the given transmitted message is anomalous based on the different data transfer session and a context of the vehicle and/or in-vehicle communications network.

2. The method according to claim 1 wherein the at least one feature of the given transmitted message comprises a source port at which the given transmitted message is received by the in-vehicle communication network.

3. The method according to claim 1 wherein the at least one feature of the transmitted message comprises a destination of the given transmitted message in the in-vehicle communications network, and/or an identity (ID) of the given transmitted message.

4. The method according to claim 1 wherein the at least one feature of the given transmitted message comprises a value in a payload of the given transmitted message.

5. The method according to claim 1 wherein the at least one expected feature designates a context of the vehicle and/or the in-vehicle communications network.

6. The method according to claim 5 wherein comparing the at least one feature of the given transmitted message to determine whether or not the at least one feature of the given transmitted message is expected comprises determining whether the given transmitted message is expected for the designated context.

7. A method of monitoring communications propagating in an in-vehicle communications network of a vehicle, the method comprising:
  monitoring messages transmitted over at least a portion of the in-vehicle network;
  determining if the transmitted messages are indicative of at least one current standard data transfer session being conducted over the in-vehicle network;
  comparing at least one feature of a given message of the transmitted messages to at least one expected feature of a message comprised in a model of the at least one current data transfer session to determine whether or not the at least one feature of the transmitted message is expected;
  determining that the given transmitted message is an anomalous message if the feature of the given transmitted message is determined to be unexpected;
  wherein if the given transmitted message is determined not to be configured to initiate a different data transfer session, comparing the at least one feature comprises determining whether the given transmitted message is a message belonging to a data session of the at least one current data transfer session and if not determining that the given transmitted message is unexpected.

8. The method according to claim 1 wherein the at least one feature of the given transmitted messages comprises a time interval between transmission of the given transmitted message and another message of the monitored messages.

9. The method according to claim 1 wherein the at least one feature of the given transmitted message comprises an order of transmission of the given transmitted message and another message of the monitored messages.

10. The method according to claim 1 wherein monitoring messages transmitted over at least a portion of the in-vehicle network comprises monitoring messages transmitted over a plurality of different portions of the in-vehicle network.

11. The method according to claim 10 and comprising determining that a first message transmitted over a first portion of the plurality of portions is anomalous if it is inconsistent with a second message transmitted over a second portion of the plurality of portions.

12. The method according to claim 11 and comprising determining that the first message is inconsistent with the second message if the first and second messages are received from different source ports.

13. The method according to claim 1 wherein if the monitored messages are not indicative of at least one current data transfer session being conducted over the in-vehicle network the given transmitted message is determined to be anomalous.

14. The method according to claim 1 and comprising generating the model of the data transfer session.

15. The method according to claim 1 and comprising updating the model to reduce false positive and/or false negatives in determining whether a message is anomalous or not.

16. The method according to claim 1 wherein data transfer session comprises a diagnostic session.

17. The method according to claim 1 wherein data transfer session comprises software update session.

18. A method of monitoring communications propagating in an in-vehicle communications network of a vehicle, the method comprising:
  monitoring messages transmitted over at least a portion of the in-vehicle network;
  determining if the transmitted messages are indicative of at least one current data transfer session being conducted over the in-vehicle network;
  comparing at least one feature of a given message of the transmitted messages to at least one expected feature of a message comprised in a model of the at least one current data transfer session to determine whether or not the at least one feature of the transmitted message is expected wherein the at least one feature comprises a time interval between transmission of the given transmitted message and another message of the monitored messages;
  determining that the given transmitted message is an anomalous message if the feature of the given transmitted message is determined to be unexpected.

19. A method of monitoring communications propagating in an in-vehicle communications network of a vehicle, the method comprising:
  monitoring messages transmitted over at least a portion of the in-vehicle network;
  determining if the transmitted messages are indicative of at least one current data transfer session being conducted over the in-vehicle network;
  comparing at least one feature of a given message of the transmitted messages to at least one expected feature of a message comprised in a model of the at least one current data transfer session to determine whether or not the at least one feature of the transmitted message is expected wherein the at least one feature of the given transmitted message comprises an order of transmission of the given transmitted message and another message of the monitored messages;
  determining that the given transmitted message is an anomalous message if the feature of the given transmitted message is determined to be unexpected.

20. A method of monitoring communications propagating in an in-vehicle communications network of a vehicle, the method comprising:
  monitoring messages transmitted over at least a portion of the in-vehicle network;
  determining if the transmitted messages are indicative of at least one data transfer session being conducted over the in-vehicle network;
  comparing at least one feature of a given message of the transmitted messages to at least one expected feature of a message comprised in a model of the at least one current data transfer session to determine whether or not the at least one feature of the transmitted message is expected and if the transmitted message is configured to initiate a data transfer session different from the determined at least one current data transfer session determining that the transmitted message is unexpected;

determining that the given transmitted message is an anomalous message if the feature of the given transmitted message is determined to be unexpected.

* * * * *